United States Patent
Choi (10) Patent No.: US 11,691,671 B2
(45) Date of Patent: Jul. 4, 2023

(54) SYSTEM FOR ROAD SLOPE COMPENSATION USING CAMERA INFORMATION AND METHOD THEREOF

(71) Applicant: Hyundai Mobis Co., Ltd., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 151 days.

(21) Appl. No.: 16/952,263

(22) Filed: Nov. 19, 2020

(65) Prior Publication Data

US 2021/0188350 A1    Jun. 24, 2021

(30) Foreign Application Priority Data

Dec. 18, 2019    (KR) .......................... 10-2019-0170245

(51) Int. Cl.
*B62D 6/04*    (2006.01)
*B62D 5/04*    (2006.01)
*G06T 7/60*    (2017.01)

(52) U.S. Cl.
CPC ............. *B62D 6/04* (2013.01); *B62D 5/0463* (2013.01); *G06T 7/60* (2013.01); *G06T 2207/30256* (2013.01)

(58) Field of Classification Search
CPC .. B62D 5/0463; B62D 15/029; B62D 15/025; G06T 7/60; B60W 30/182; B60W 40/09; B60W 2552/15; B60W 40/076; B60W 2520/28
See application file for complete search history.

(56) References Cited

U.S. PATENT DOCUMENTS

| | | | |
|---|---|---|---|
| 7,684,945 B2 * | 3/2010 | Walter | G01C 25/00 348/148 |
| 7,957,897 B2 | 6/2011 | Basnayake et al. | |
| 9,771,072 B2 | 9/2017 | Park | |
| 11,175,661 B2 * | 11/2021 | Satake | G05D 1/0088 |
| 2009/0309793 A1 * | 12/2009 | Loomis | G01C 21/12 702/96 |
| 2014/0309803 A1 | 10/2014 | You et al. | |
| 2015/0298694 A1 | 10/2015 | Park | |
| 2016/0075334 A1 * | 3/2016 | Terazawa | B62D 15/025 701/41 |
| 2016/0152237 A1 * | 6/2016 | Takahashi | B62D 6/00 701/41 |
| 2018/0001900 A1 * | 1/2018 | Bajpai | B60W 40/114 |
| 2018/0188739 A1 * | 7/2018 | Tseng | B60W 30/12 |

FOREIGN PATENT DOCUMENTS

| | | | | |
|---|---|---|---|---|
| CN | 101334294 | | 12/2008 | |
| CN | 103832435 | | 6/2014 | |
| CN | 104097641 | | 10/2014 | |
| CN | 20150051680 A | * | 5/2015 | .......... B60W 30/143 |
| KR | 10-1567207 | | 11/2015 | |

* cited by examiner

*Primary Examiner* — Jeff A Burke
*Assistant Examiner* — Jerrod Irvin Davis
(74) *Attorney, Agent, or Firm* — H.C. Park & Associates, PLC (57) ABSTRACT

The inventive concepts determines a threshold road slope based on camera information and lateral acceleration of a vehicle, estimates the road slope, compensates the estimated road slope to an ADAS driving convenience system, and thus prevents the vehicle from being inclined to the road slope in a section where a threshold road slope is present, thereby securing the driving stability of the vehicle by driving the vehicle in the middle of the lane on a road having the threshold road slope.

17 Claims, 7 Drawing Sheets

SYSTEM FOR ROAD SLOPE COMPENSATION USING CAMERA INFORMATION AND METHOD THEREOF

CROSS-REFERENCE TO RELATED APPLICATION

This application claims priority from and the benefit of Korean Patent Application No. 10-2019-0170245, filed on Dec. 18, 2019, which is hereby incorporated by reference for all purposes as if set forth herein

BACKGROUND

Field

Exemplary embodiments inventive concepts relate to a road slope compensation system using camera information, and a method thereof, and more particularly, relate to a road slope compensation system using camera information that determines a road slope based on camera information and lateral acceleration of a vehicle, estimates the road slope, and assists an Advanced Driving Assistance System (ADAS) driving convenience controller in order to drive the vehicle to the center of a lane on a road where the road slope is present, and a method thereof.

Discussion of the Background

ADAS refers to an advanced driver assistance system for assisting a driver's driving, and is configured to sensing situations in front of a vehicle, to determine situations based on the sensed result, and to control the behavior of a vehicle based on the situation determination. In particular, a lane tracking assistance system refers to a system that automatically controls a steering device to drive in the center of a lane.

The lane tracking assistance system may grasp the location of a vehicle in a lane by using a sensor recognizing a lane, may calculate the required steering angle necessary to position the vehicle in the center of the lane, and then may calculate a steering torque for tracking the required steering angle to control the steering of the vehicle depending on the calculated steering torque. However, there is a difference between the rotation torque and restoration torque of the steering system when a road slope or dispersion of a steering system occurs. As the steering angle is generated in the direction of the large rotation torque, the vehicle may be inclined to one side.

There is a prior art disclosed as Korean Registered Patent Publication No. 10-1567207 (Patent Document 1).

The above information disclosed in this Background section is only for enhancement of understanding of the background of the invention and, therefore, it may contain information that does not constitute prior art.

SUMMARY

Features of the inventive concepts will be set forth in the description which follows, and in part will be apparent from the description, or may be learned by practice of the inventive concepts.

An aspect of the inventive concepts provides a road slope compensation system using camera information that determines a road slope based on camera information and lateral acceleration of a vehicle, estimates the road slope, compensates the estimated road slope to an ADAS driving convenience system, and thus prevents the vehicle from being inclined to the road slope in a section where a road slope is present, thereby securing the driving stability of the vehicle by driving the vehicle in the middle of the lane on a road having the road slope, and a method thereof.

The technical problems to be solved by the present inventive concept are not limited to the aforementioned problems, and any other technical problems not mentioned herein will be clearly understood from the following description by those skilled in the art to which the inventive concepts pertains.

According to an aspect of the inventive concepts, a road slope compensation system using camera information may include a camera module configured to capture and obtain a front image of a vehicle, a vehicle sensor device configured to sense and obtain state information of the vehicle, a compensation calculation device configured to calculate a compensation yaw rate, using a sensor signal delivered from the vehicle sensor device and a heading error by the front image delivered from the camera module, when the vehicle is driving on a road having a road slope, and a correction controller configured to calculate a final yaw rate by applying a compensation yaw rate delivered from the compensation calculation device, to a target yaw rate calculated by using the sensor signal, a line curvature yaw rate by the front image, and a current heading, and calculating a final steering torque by the final yaw rate to control a steering device.

In an embodiment, the compensation calculation device may calculate an estimated heading, using the line curvature yaw rate and the current heading, may calculate the heading error, using the estimated heading and the current heading, and may calculate a compensation yaw rate, using the heading error.

In an embodiment, the curvature yaw rate may be calculated by following Equation "Curvature Yaw rate=Measured Yaw rate−(Curvature*Vs)" (Here, the measured yaw rate is a measured value by a yaw rate sensor, a curvature is a curvature radius of the road having the road slope, and Vs is a speed of the vehicle).

In an embodiment, the estimated heading may be calculated by following Equation "Estimated Heading=$\int_{t0}^{t1}$ Curvature Yaw rate dt+Current Heading" (t0 is a point in time when line control is activated, and t1 is a point in time when a reset condition is determined).

In an embodiment, the heading error may be calculated by following Equation "Heading error=Estimated Heading−Current Heading".

In an embodiment, the compensation yaw rate may be calculated by following Equation "Compensation Yaw rate=Heading error*Compensation Gain".

In an embodiment, the final yaw rate may be calculated by following Equation "Final Yaw rate=Target Yaw rate+Compensation Yaw rate".

In an embodiment, the correction controller may control a steering device after calculating the final steering torque by using the compensation yaw rate to compensate for a performance difference between left tracking and right tracking of the vehicle, which is caused by the road slope.

In an embodiment, the final steering torque may be calculated by following Equation "Final steering Torque=Existing torque+Compensation Torque", and the compensation Torque may be calculated by following Equation "Compensation Torque=Gain*Compensation Yaw rate".

According to an aspect of the inventive concepts, a road slope compensation method using camera information may include calculating a compensation yaw rate, using a sensor signal delivered from a vehicle sensor device sensing and obtaining state information of a vehicle, and a heading error by a front image delivered from the camera module capturing and obtaining the front image of the vehicle, when the vehicle is driving on a road having a road slope, and calculating, by a correction controller, a final yaw rate by applying a compensation yaw rate delivered from the compensation calculation device, to a target yaw rate calculated by using the sensor signal, a line curvature yaw rate by the front image, and a current heading, and calculating a final steering torque by the final yaw rate to control a steering device.

In an embodiment, the calculating of the compensation yaw rate may include calculating an estimated heading, using a sensor signal, the line curvature yaw rate by the front image, and the current heading, calculating the heading error, using the estimated heading and the current heading, and calculating a compensation yaw rate, using the heading error.

In an embodiment, the calculating of the compensation yaw rate may include calculating the curvature yaw rate by following Equation "Curvature Yaw rate=Measured Yaw rate−(Curvature*Vs)" (Here, the measured yaw rate is a measured value by a yaw rate sensor; a curvature is a curvature radius of the road having the road slope, and Vs is a speed of the vehicle).

In an embodiment, the calculating of the compensation yaw rate may include calculating the estimated heading by following Equation "Estimated Heading=$\int_{t0}^{t1}$ Curvature Yaw rate dt+Current Heading" (t0 is a point in time when line control is activated, and t1 is a point in time when a reset condition is determined).

In an embodiment, the calculating of the compensation yaw rate may include calculating the heading error by following Equation "Heading error=Estimated Heading−Current Heading".

In an embodiment, the calculating of the compensation yaw rate may include calculating the compensation yaw rate by following Equation "Compensation Yaw rate=Heading error*Compensation Gain".

In an embodiment, the controlling of the steering device may include calculating the final yaw rate by following Equation "Final Yaw rate=Target Yaw rate+Compensation Yaw rate".

In an embodiment, the controlling of the steering device may include controlling, by the correction controller, the steering device after calculating a final steering torque by using the compensation yaw rate to compensate for a performance difference between left tracking and right tracking of the vehicle, which is caused by the road slope.

In an embodiment, the controlling of the steering device may include calculating the final steering torque by following Equation "Final steering Torque=Existing torque+Compensation Torque", and calculating the compensation torque by following Equation "Compensation Torque=Gain*Compensation Yaw rate".

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other objects, features and advantages of the inventive concepts will be more apparent from the following detailed description taken in conjunction with the accompanying drawings.

DETAILED DESCRIPTION OF THE ILLUSTRATED EMBODIMENTS

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

inventive concepts In the drawings, the same reference numerals will be used throughout to designate the same or equivalent elements. In addition, a detailed description of well-known features or functions will be ruled out in order not to unnecessarily obscure the gist of the inventive concepts.

In describing elements of exemplary embodiments of the inventive concepts, the terms first, second, A, B, (a), (b), and the like may be used herein. These terms are used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the inventive concepts and the relevant art and will not be interpreted in an idealized or overly formal sense unless expressly so defined herein.

Hereinafter, various embodiments of the inventive concepts will be described in detail with reference to FIGS. 1 to 4.

Figure 1:
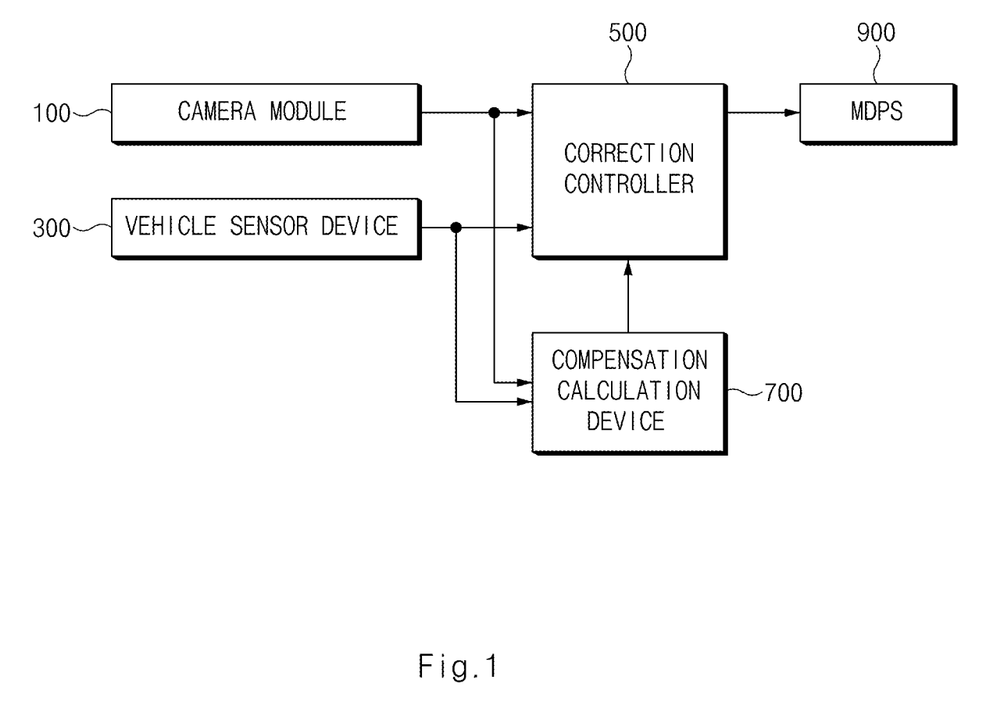
FIG. 1 is a block diagram illustrating a road slope compensation system using camera information according to an embodiment of the inventive concepts.
Figure 2:
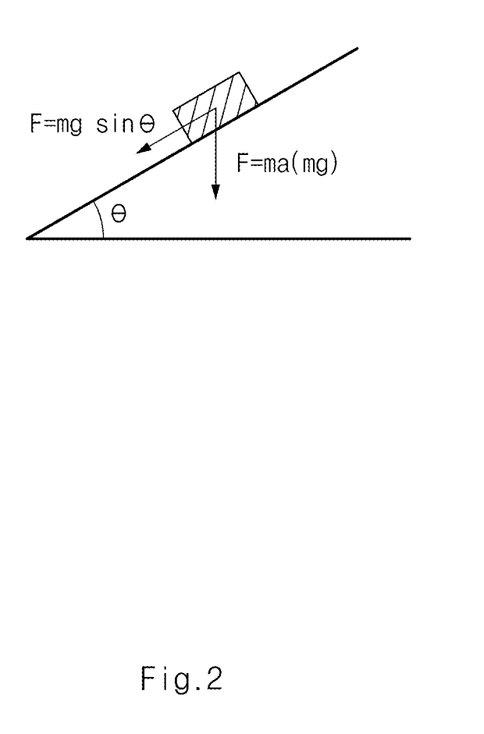
FIG. 2 is a view illustrating generation of lateral acceleration in a vehicle, to which a road slope compensation system using camera information is applied, due to a road slope on a road according to an embodiment of the inventive concepts.

FIG. 1 is a block diagram illustrating a road slope compensation system using camera information according to an embodiment of the inventive concepts. FIG. 2 is a view illustrating generation of lateral acceleration in a vehicle, to which a road slope compensation system using camera information is applied, due to a road slope on a road according to an embodiment of the inventive concepts. FIG. 3 is a graph illustrating a progress status of a vehicle before a road slope compensation system using camera information is applied, according to an embodiment of the inventive concepts. FIG. 4 is a graph illustrating a progress status of a vehicle after a road slope compensation system using camera information is applied, according to an embodiment of the inventive concepts.

Referring to FIG. 1, a road slope compensation system using camera information according to an embodiment of the inventive concepts may include ADAS including Autonomous Emergency Braking (AEB), Lane Keep Assist System (LKAS), Advanced Smart Cruise Control (ASCC), Active Blind Spot Detection (ABSD), Around View Monitor (AVM), and the like; the road slope compensation system may include a camera module 100, a vehicle sensor device 300, a correction controller 500, a compensation calculation device 700, and a steering device 900.

The camera module 100 may capture and obtain a front image of a vehicle. The vehicle sensor device 300 may be configured to sense information about a vehicle equipped with ADAS and information about an external object, and may include radar, LiDAR, a speed sensor, a heading sensor, a torque sensor, a lateral acceleration sensor, a yaw rate sensor, and the like.

The steering device 900 may include a steering angle sensor that measures the steering angle of a steering wheel. The steering device 900 may receive the steering angle calculated by the correction controller 500, and may steer a wheel by adjusting the steering angle of the steering wheel depending on the calculated steering angle.

The steering device 900 may be implemented with Motor Driven Power Steering (MDPS).

The correction controller 500 may be included in an Electronic Control Unit (ECU). The correction controller 500 may calculate the difference between a target yaw rate and the yaw rate measured by a yaw rate sensor, and may modify the target yaw rate using the calculated difference when a vehicle is driving on a road having a road slope. The steering of the steering wheel may be controlled to implement the modified target yaw rate.

That is, the correction controller 500 may determine whether a vehicle is driving on a road having a threshold road slope, using a line curvature calculated based on the line information captured by the camera module 100 and a vehicle curvature sensed by the vehicle sensor device 300. Next, when the absolute value of the difference (|vehicle curvature−line curvature|) between the vehicle curvature and the line curvature exceeds a threshold, the correction controller 500 may determine that there is a possibility of a road having a threshold road slope. Also, when the determination is repeated more than the specific number of times, the correction controller 500 may determine that the vehicle is driving on the road having a threshold road slope.

Then, the correction controller 500 may control the operation of the steering device 900 for road slope compensation when the vehicle is driving on the road having the threshold road slope.

The correction controller 500 measures the current yaw rate through a yaw rate sensor, and calculates the difference between the measured yaw rate and the target yaw rate as a compensation value (measured yaw rate−target yaw rate). In addition, the steering device 900 may be controlled to modify the target yaw rate, using the difference between the current yaw rate and the target yaw rate.

That is, the modified target yaw rate may be calculated by Equation 1.

$$\text{Modified Target Yaw rate} = \text{Target Yaw rate} + (\text{Compensation Value} \times \text{Gain}) \quad \text{[Equation 1]}$$

Afterward, to implement the modified target yaw rate, the steering device 900 may control the steering angle of the steering wheel.

However, referring to FIG. 2, in the case of a road having the threshold road slope, the vehicle may receive additional lateral acceleration force.

For example, when the lateral acceleration is estimated for a road slope of 1.5%, about 0.3767 deg/s yaw rate may occur for normal straight driving in the vehicle at 80 KPH (roughly 50 MPH).

That is, additional lateral acceleration due to road slope occurs as compared to a horizontal road, and therefore embodiments described herein having a threshold road slope compensate for the existing target yaw rate by estimating the lateral acceleration (angular velocity) occurring at a measured road slope within the threshold slope. Embodiments estimate and compensate for the target yaw rate using compensation and using the actual heading (Reference) by the camera module 100, by calculating vehicle-based heading through the yaw rate estimation of the vehicle in a state where the vehicle is moving.

When a vehicle is driving on the road in the threshold road slope, the compensation calculation device 700 may calculate the compensation yaw rate, using the sensor signal delivered from the vehicle sensor device 300 and the heading error by the front image delivered from the camera module 100.

For example, the compensation calculation device 700 may calculate the estimated heading using the line curvature yaw rate and the current heading of the vehicle, may calculate a heading error, using the estimated heading and the current heading, and may calculate a compensation yaw rate, using the heading error.

The curvature yaw rate may be calculated by Equation 2.

Curvature Yaw rate=Measured Yaw rate−(Curvature*$Vs$) [Equation 2]

Here, the measured yaw rate may be the measured value by a yaw rate sensor. The curvature may be a curvature radius of the road having a threshold road slope; and Vs may be the speed of a vehicle.

Because the road curvature of 3000~5000 R obtained from a straight road has a significant effect on the estimation of the heading, the yaw rate may be calculated in consideration of the curvature.

In addition, when a cut-in of the preceding vehicle occurs, the curvature may be invalid because the view-range is small, and thus whether to reflect the curvature yaw rate may be determined by using the gradient direction and the sign of a road curvature.

The estimated heading may be calculated by Equation 3.

Estimated Heading=$\int_{t0}^{t1}$ Curvature Yaw rate $dt$+Current Heading [Equation 3]

Here, t0 is a point in time when line control is activated; t1 is a point in time when a reset condition is determined.

For reference, the reset condition may be a case that line control activation is started, a case of a curved road with a curvature radius of 5000R or less, a case that a vehicle is located in the middle of the lane, a case that the past direction of the difference in yaw rate tracking performance for a set time period such as four (4) seconds is different from the direction of the heading estimation error, or a case that it is time to switch to a driver's hands-on state.

The heading error may be calculated by Equation 4.

Heading Error=Estimated Heading−Current Heading [Equation 4]

In the meantime, the moving average of, for example, 5 seconds is applied to the heading error signal, which is configured to reflect the compensation yaw rate. In this way, a small delay may occur, but the heading error signal is applied to compensate for a constant average value. Also, the effect on an error from estimating the heading error due to the external disturbance may be reduced by the average.

The compensation yaw rate is calculated by Equation 5.

Compensation Yaw rate=Heading Error*Compensation Gain [Equation 5]

Furthermore, when line control is activated, the operating condition of the compensation yaw rate is a case where a vehicle speed is not less than 40 KPH or a case that the yaw rate compensation is in the direction for assistance toward the center of the line; when the line control activation is terminated, the release condition of the compensation yaw rate is a case where a vehicle speed is not greater than 35 KPH or a case that the yaw rate compensation is not in the direction for assistance toward the center of the line.

As described above, when the compensation yaw rate is calculated, the compensation yaw rate is transmitted to the correction controller 500.

The correction controller 500 may calculate the final yaw rate by applying the compensation yaw rate delivered from the compensation calculation device 700 to the target yaw rate calculated using the line curvature yaw rate and the current heading.

The final yaw rate may be calculated by Equation 6.

Final Yaw rate=Target Yaw rate+Compensation Yaw rate [Equation 6]

In the meantime, a performance difference between the vehicle's left tracking and right tracking may occur due to the force generated by the threshold road slope. That is, the generation amount of left yaw rate is different from the generation amount of right yaw rate, and thus the desired torque may be different.

Accordingly, to compensate for the performance difference between the vehicle's left tracking and right tracking, which is caused by the threshold road slope, the correction controller 500 may control the steering device 900 after calculating the final steering torque using the compensation yaw rate.

The final steering torque may be calculated by Equation 7.

Final Steering Torque=Existing Torque+compensation Torque [Equation 7]

At this time, the compensation torque may be calculated by Equation 8.

Compensation Torque=Gain*Compensation Yaw rate [Equation 8]

Figure 3A:
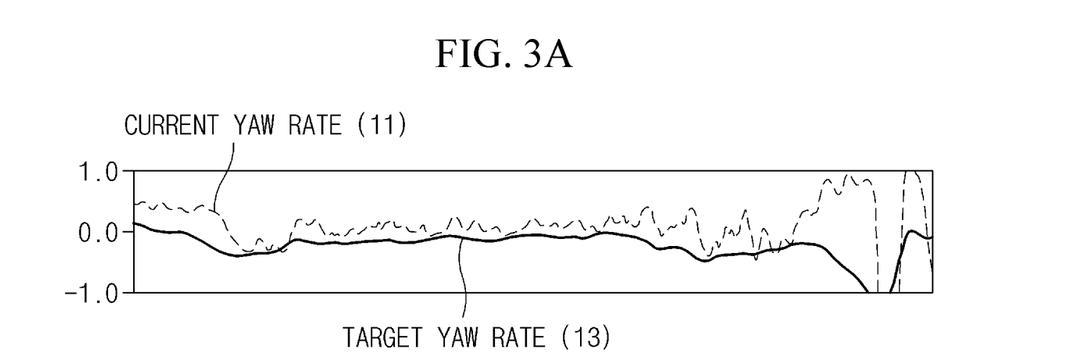
FIGS. 3A, 3B, 3C, and 3D are graphs illustrating progress status of a vehicle before a road slope compensation system using camera information is applied, according to an embodiment of the inventive concepts.
Figure 3B:
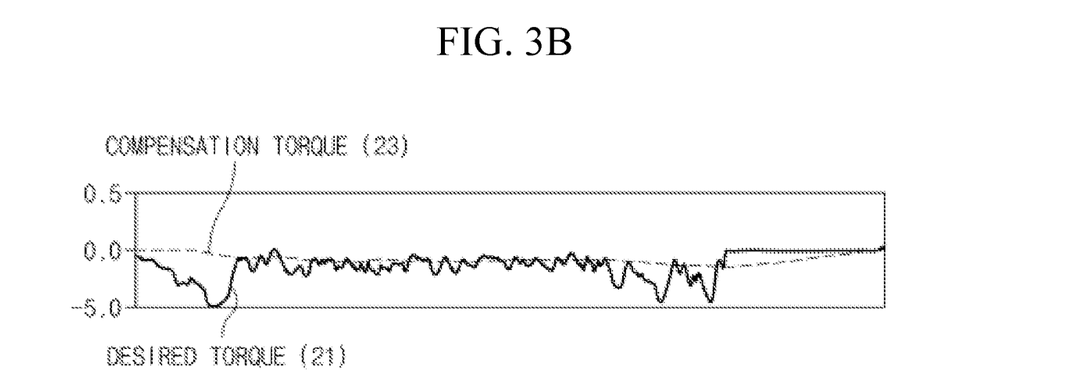

Referring to FIGS. 3A to 3D, in the case of not applying the compensation yaw rate according to an embodiment of the inventive concepts, FIG. 3A illustrates a current yaw rate 11 and a target yaw rate 13 of a vehicle; FIG. 3B illustrates a desired torque 21 calculated in real time for the current yaw rate 11 to follow the target yaw rate 13; the steering device 900 may be controlled such that the desired torque 21 is applied to the steering.

Figure 3C:
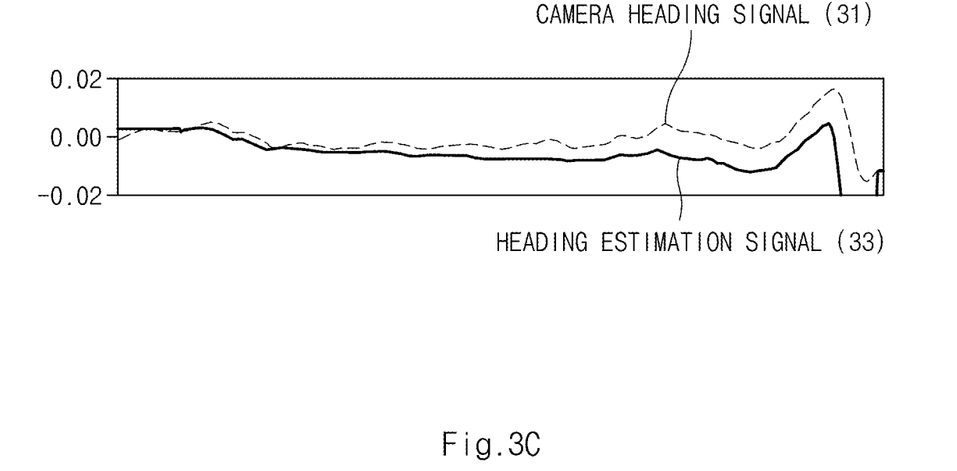
Figure 3D:
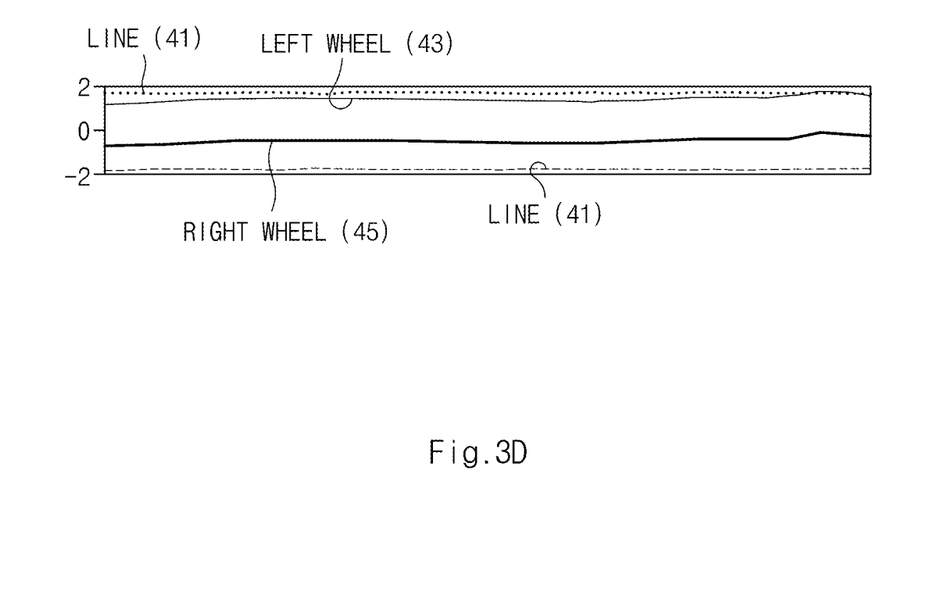

FIG. 3C illustrates a camera heading signal 31 recognized by the camera module 100 and a predicted heading estimation signal 33. FIG. 3D illustrates the location of a vehicle in a line, and illustrates a line 41, a left wheel 43 of the vehicle, and a right wheel 45 of the vehicle.

Figure 4A:
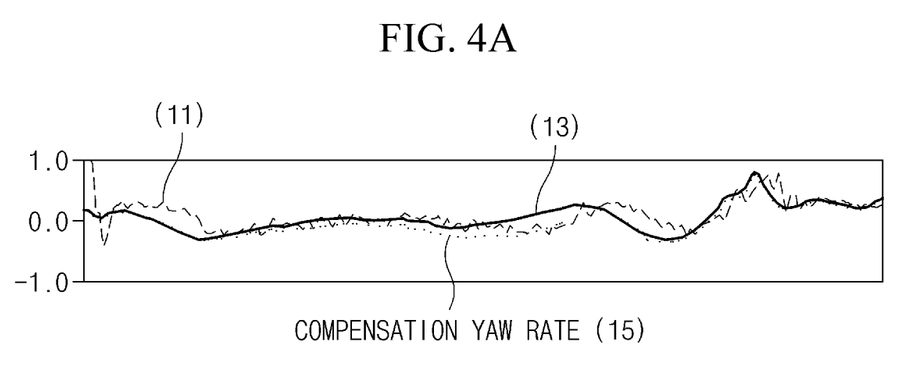
FIGS. 4A, 4B, 4C, and 4D are graphs illustrating progress status of a vehicle after a road slope compensation system using camera information is applied, according to an embodiment of the inventive concepts.

Referring to FIGS. 4A to 4D, in the case of applying the compensation yaw rate according to an embodiment of the inventive concepts, FIG. 4A illustrates a finally-compensated target yaw rate 15 by adding the current yaw rate 11, the target yaw rate 13, and the compensation yaw rate of a vehicle. This indicates that the vehicle may be further moved to the right.

Figure 4B:
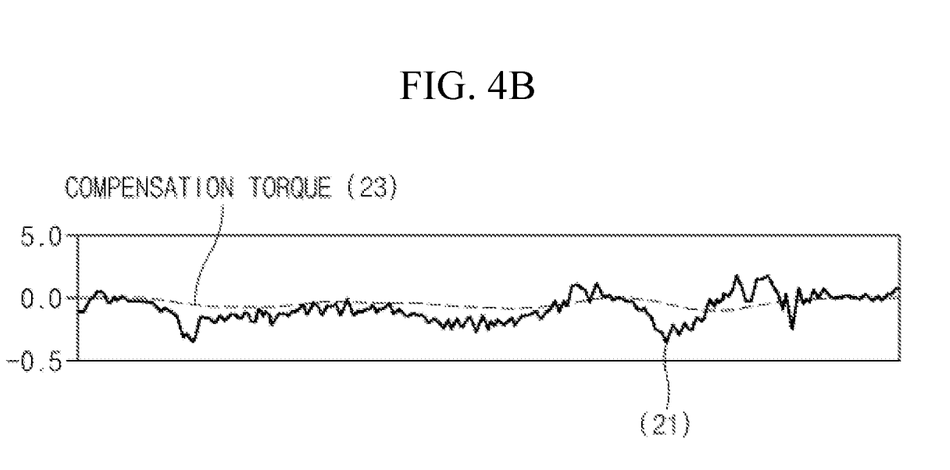

FIG. 4B illustrates the desired torque 21 calculated in real time such that the current yaw rate 11 better follows the compensated target yaw rate 15.

Figure 4C:
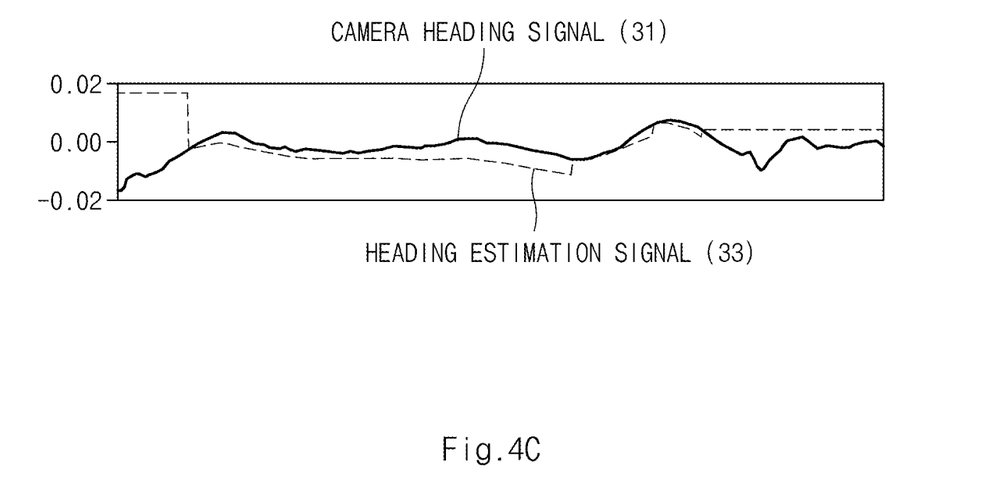
Figure 4D:
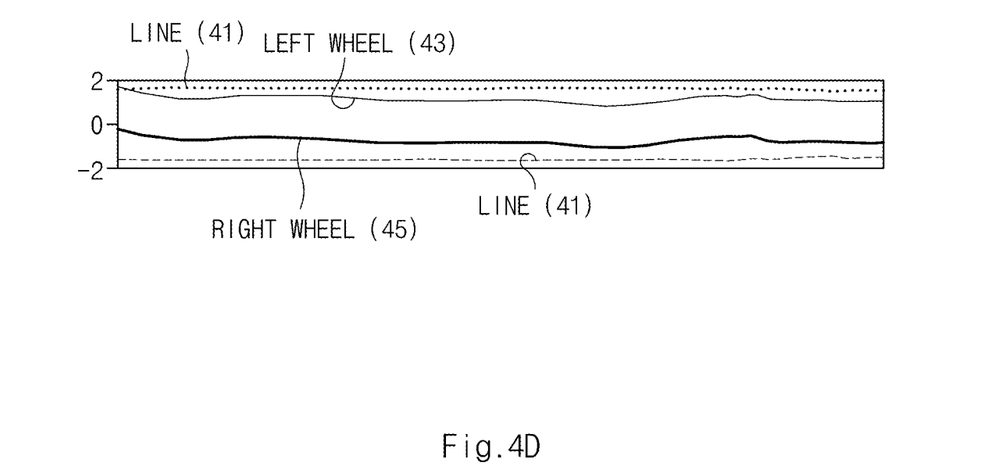

FIG. 4C illustrates the camera heading signal 31 recognized by the camera module 100 and the predicted heading estimation signal 33. FIG. 4D illustrates the location of a vehicle in a line, and illustrates the line 41, the left wheel 43 of the vehicle, and the right wheel 45 of the vehicle.

As a result, when the compensation yaw rate according to an embodiment of the inventive concepts is applied, the vehicle close to the left side on the road slope may drive while further moving to the right side to drive in the middle of the road.

Figure 5:
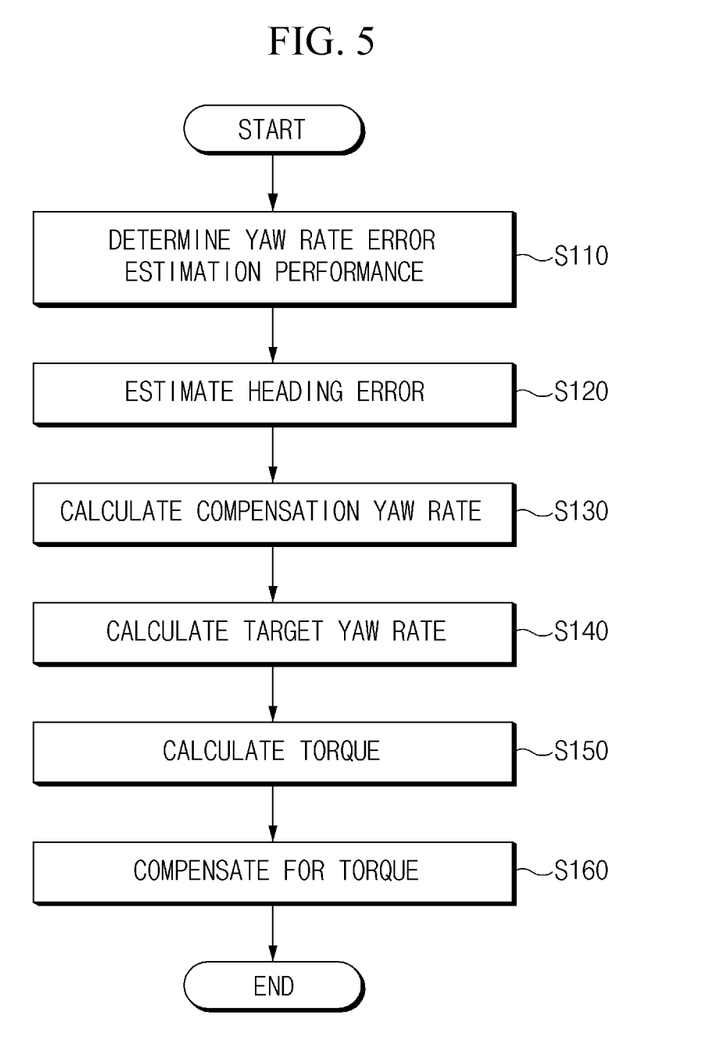
FIG. 5 is a flowchart illustrating a road slope compensation method using camera information according to an embodiment of the inventive concepts.

Hereinafter, a road slope compensation method using camera information according to another embodiment of the inventive concepts will be described in detail with reference to FIG. 5. FIG. 5 is a flowchart illustrating a road slope compensation method using camera information according to an embodiment of the inventive concepts.

Hereinafter, it is assumed that a road slope compensation method using camera information of FIG. 1 performs the process of FIG. 5.

For example, the method determines the yaw rate error estimation performance by applying an activation of a vehicle's line control, a straight road with a curvature radius of 5000R or more, within the target yaw rate of ±1 deg/s, a driver's hands-off state, or the moving average of the yaw rate Error of tracking performance for 4 seconds (S110).

Next, the compensation calculation device 700 calculates the estimated heading, using the sensor signal delivered from the vehicle sensor device 300 sensing and obtaining state information of a vehicle, the line curvature yaw rate by the front image delivered from the camera module 100 capturing and obtaining the front image of the vehicle, and the current heading when the vehicle is driving on a road having a threshold road slope.

Then, the method calculates a heading error, using the estimated heading and the current heading (S120).

Next, the method calculates a compensation yaw rate, using the heading error (S130).

Subsequently, in the correction controller 500, the method calculates the final yaw rate by applying the compensation yaw rate delivered from the compensation calculation device 700 to the target yaw rate calculated using the sensor signal, the line curvature yaw rate by the front image, and the current heading (S140).

Subsequently, the method may calculate the final steering torque by the final yaw rate (S150), and then may control the steering device (S160).

As described above, a road slope compensation system using camera information, and a method thereof determines a threshold road slope based on camera information and lateral acceleration of a vehicle, estimates the road slope, compensates the estimated road slope to an ADAS driving convenience system, and thus prevents the vehicle from being inclined to the road slope in a section where a threshold road slope is present, thereby securing the driving stability of the vehicle by driving the vehicle in the middle of the lane on a road having the threshold road slope.

In the meantime, according to an embodiment of the inventive concepts, a road slope compensation method using camera information according to operations S110 to S160 may be programmed and stored in a computer-readable medium.

Hereinabove, although the inventive concepts has been described with reference to exemplary embodiments and the accompanying drawings, the inventive concepts is not limited thereto, but may be variously modified and altered by those skilled in the art to which the inventive concepts pertains without departing from the spirit and scope of the inventive concepts claimed in the following claims.

Therefore, embodiments of the inventive concepts are not intended to limit the technical spirit of the inventive concepts, but provided only for the illustrative purpose. The scope of protection of the inventive concepts should be construed by the attached claims, and all equivalents thereof should be construed as being included within the scope of the inventive concepts.

Embodiments described herein determine a threshold road slope based on camera information and lateral acceleration of a vehicle, estimate the road slope, compensate the estimated road slope to an ADAS driving convenience system, and thus prevent the vehicle from being inclined to the road slope in a section where a threshold road slope is present, thereby securing the driving stability of the vehicle by driving the vehicle in the middle of the lane on a road having the threshold road slope.

Besides, a variety of effects directly or indirectly understood through the specification may be provided.

Hereinabove, although the inventive concepts has been described with reference to exemplary embodiments and the accompanying drawings, the inventive concepts is not limited thereto, but may be variously modified and altered by those skilled in the art to which the inventive concepts pertains without departing from the spirit and scope of the inventive concepts claimed in the following claims.

What is claimed is:

1. A road slope compensation system using camera information, the system comprising:
    a camera module configured to capture and obtain a front image of a vehicle;
    a vehicle sensor device configured to sense and obtain state information of the vehicle;
    a compensation calculation device configured to calculate a compensation yaw rate, using a sensor signal delivered from the vehicle sensor device and a heading error by the front image delivered from the camera module, when the vehicle is driving on a road having a threshold road slope; and
    a correction controller configured to:
    calculate a final yaw rate by applying a compensation yaw rate delivered from the compensation calculation device, to a target yaw rate calculated by using the sensor signal, a line curvature yaw rate by the front image, and a current heading; and
    calculate a final steering torque by the final yaw rate to control a steering device,
    wherein the correction controller controls a steering device after calculating the final steering torque by using the compensation yaw rate to compensate for a performance difference between left tracking and right tracking of the vehicle, which is caused by the threshold road slope.

2. The system of claim 1, wherein the compensation calculation device calculates an estimated heading, using the line curvature yaw rate and the current heading, calculates the heading error, using the estimated heading and the current heading, and calculates a compensation yaw rate, using the heading error.

3. The system of claim 2, wherein the curvature yaw rate is calculated by the following Equation:

$$\text{Curvature Yaw rate} = \text{Measured Yaw rate} - (\text{Curvature} * V_s)$$

where, the measured yaw rate is a measured value by a yaw rate sensor, a curvature is a curvature radius of the road having the threshold road slope, and Vs is a speed of the vehicle.

4. The system of claim 3, wherein the estimated heading is calculated by following Equation:

$$\text{Estimated Heading} = \int_{t_0}^{t_1} \text{Curvature Yaw rate } dt + \text{Current Heading},$$

where t0 is a point in time when line control is activated, and t1 is a point in time when a reset condition is determined.

5. The system of claim 4, wherein the heading error is calculated by the following Equation:

$$\text{Heading error} = \text{Estimated Heading} - \text{Current Heading}.$$

6. The system of claim 5, wherein the compensation yaw rate is calculated by the following Equation:

$$\text{Compensation Yaw rate} = \text{Heading error} * \text{Compensation Gain}.$$

7. The system of claim 6, wherein the final yaw rate is calculated by the following Equation:

$$\text{Final Yaw rate} = \text{Target Yaw rate} + \text{Compensation Yaw rate}.$$

8. The system of claim 7, wherein the final steering torque is calculated by the following Equation:

Final steering Torque=Existing torque+Compensation Torque, and wherein the compensation Torque is calculated by following Equation:

Compensation Torque=Gain*Compensation Yaw rate.

9. A road slope compensation method using camera information, the method comprising:
calculating a compensation yaw rate, using a sensor signal delivered from a vehicle sensor device sensing and obtaining state information of a vehicle, and a heading error by a front image delivered from the camera module capturing and obtaining the front image of the vehicle, when the vehicle is driving on a road having a threshold road slope; and
calculating, by a correction controller, a final yaw rate by applying a compensation yaw rate delivered from the compensation calculation device, to a target yaw rate calculated by using the sensor signal, a line curvature yaw rate by the front image, and a current heading, and calculating a final steering torque by the final yaw rate to control a steering device,
wherein the controlling of the steering device includes:
controlling, by the correction controller, the steering device after calculating a final steering torque by using the compensation yaw rate to compensate for a performance difference between left tracking and right tracking of the vehicle, which is caused by the threshold road slope.

10. The method of claim 9, wherein the calculating of the compensation yaw rate includes:
calculating an estimated heading, using a sensor signal, the line curvature yaw rate by the front image, and the current heading;
calculating the heading error, using the estimated heading and the current heading; and
calculating a compensation yaw rate, using the heading error.

11. The method of claim 10, wherein the calculating of the compensation yaw rate includes:
calculating the curvature yaw rate by the following Equation:

Curvature Yaw rate=Measured Yaw rate−(Curvature*$Vs$), where the measured yaw rate is a measured value by a yaw rate sensor, a curvature is a curvature radius of the road having the threshold road slope, and Vs is a speed of the vehicle.

12. The method of claim 11, wherein the calculating of the compensation yaw rate includes:
calculating the estimated heading by following Equation:

Estimated Heading=$\int_{t0}^{t1}$ Curvature Yaw rate $dt$+Current Heading, where t0 is a point in time when line control is activated, and t1 is a point in time when a reset condition is determined.

13. The method of claim 12, wherein the calculating of the compensation yaw rate includes:
calculating the heading error by the following Equation:

Heading error=Estimated Heading−Current Heading.

14. The method of claim 13, wherein the calculating of the compensation yaw rate includes:
calculating the compensation yaw rate by the following Equation:

Compensation Yaw rate=Heading error*Compensation Gain.

15. The method of claim 14, wherein the controlling of the steering device includes:
calculating the final yaw rate by the following Equation:

Final Yaw rate=Target Yaw rate+Compensation Yaw rate.

16. The method of claim 15, wherein the controlling of the steering device includes:
calculating the final steering torque by the following Equation:

Final steering Torque=Existing torque+Compensation Torque; and calculating the compensation torque by the following Equation:

Compensation Torque=Gain*Compensation Yaw rate.

17. A program stored on a non-transitory computer-readable medium configured to perform the road slope compensation method using camera information described in claim 9.

* * * * *